United States Patent
Lo et al.

(10) Patent No.: US 8,442,463 B2
(45) Date of Patent: May 14, 2013

(54) RECEIVING DEVICE AND METHOD THEREOF

(75) Inventors: Jen-Chieh Lo, Taipei County (TW); Yi-Cheng Chen, Taipei (TW); Chia-Ta Lai, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 468 days.

(21) Appl. No.: 12/719,585

(22) Filed: Mar. 8, 2010

(65) Prior Publication Data
US 2010/0233982 A1    Sep. 16, 2010

(30) Foreign Application Priority Data
Mar. 10, 2009 (TW) ................ 98107716 A (51) Int. Cl.
*H04B 1/18* (2006.01)
*H04M 1/00* (2006.01)

(52) U.S. Cl.
USPC .................... 455/161.2; 455/562.1

(58) Field of Classification Search .......... 455/561, 455/562.1, 161.1, 161.2, 161.3, 63.4; 342/361, 342/367
See application file for complete search history.

(56) References Cited

U.S. PATENT DOCUMENTS

| | | | | |
|---|---|---|---|---|
| 7,508,458 | B2* | 3/2009 | Matsuo | 348/725 |
| 7,689,161 | B2* | 3/2010 | Onomatsu et al. | 455/3.01 |
| 2004/0102221 | A1* | 5/2004 | Shirosaka et al. | 455/562.1 |
| 2005/0287968 | A1* | 12/2005 | Takagi et al. | 455/179.1 |
| 2006/0003693 | A1* | 1/2006 | Onomatsu et al. | 455/3.02 |
| 2006/0010473 | A1* | 1/2006 | Takagi et al. | 725/72 |
| 2006/0116094 | A1* | 6/2006 | Suzu | 455/154.1 |
| 2010/0087158 | A1* | 4/2010 | Chen et al. | 455/161.1 |

FOREIGN PATENT DOCUMENTS
CN    1972010    5/2007

OTHER PUBLICATIONS
CN Office Action dated Feb. 22, 2013.
English Abstract translation of CN1972010 (Published May 30, 2007).

* cited by examiner

*Primary Examiner* — Nguyen Vo
(74) *Attorney, Agent, or Firm* — McClure, Qualey & Rodack, LLP (57) ABSTRACT

A receiving device is disclosed. The receiving device includes a receiving module and a processing module. The receiving module includes a plurality of parameters. The receiving module is used for setting the parameters according to a control signal, receiving a wireless signal according to settings of the different parameters, and outputting a first output signal and a second output signal separately. The processing module couples the receiving module and generates the control to set the parameters according the first output signal and the second output signal.

16 Claims, 7 Drawing Sheets

RECEIVING DEVICE AND METHOD THEREOF

BACKGROUND OF THE INVENTION (a) Field of the Invention

The invention relates to a communication system, particularly to a wireless communication system.

(b) Description of the Related Art

In general, there are two ways for an antenna to receive a signal of a channel. One receiving method is to search signals in one direction like the commonly-used method by a fishbone antenna while the other receiving method is a complete signal searching method like reception by an electronic antenna.

While a fishbone antenna is used to search in one direction for receiving a signal, the antenna will receive a signal of a channel in only one specific direction. However, actually the sources of channel signals are from all directions but not only one direction. Thus, as the direction of the signal is different from that of antenna reception, signal quality will decrease. As the electronic antenna searches signals for receiving, parameter detection will be performed on the combinations of all possible values of various parameters in the electronic antenna, such as direction, gain, polarity, and etc. Then, the optimum signal source will be found after the combinations of all possible values of all parameters are detected so that the electronic antenna starts to receive signals. By this way, since setting the parameters of an antenna takes time, the convergence time (generally about 0.5 second) needed to wait for the whole system (for example, a tuner) is required. Therefore, it takes a lot of time to perform the above processes.

BRIEF SUMMARY OF THE INVENTION

In order to solve the above-mentioned problems, one object of the invention is to provide a receiving device that can quickly find out the direction having the optimum signal receiving quality.

One embodiment of the invention provides a receiving device, comprising a receiving module and a processing module. The receiving module includes a plurality of parameters for setting the parameters according to a control signal, receiving a wireless signal according to settings of the different parameters, and outputting a first output signal and a second output signal separately. The processing module couples to the receiving module and generates the control signal to set the parameters according the first output signal and the second output signal.

Furthermore, one embodiment of the invention provides a signal receiving method, comprising the following steps. At first, a sensing circuit is provided where the sensing circuit comprises a plurality of parameters. The parameters comprise a plurality of variable parameters. Then, a first input signal and a second input signal are received through the sensing circuit. The first input signal and the second input signal both comprise a plurality of reference values. The sensing circuit selects the first input signal and the second input signal according to the parameters and the reference values to generate an output signal. Finally, a processing circuit is provided and the processing circuit compares the first input signal with the second input signal according to the reference values to generate a control signal for controlling at least one of the variable parameters.

The receiving device and the method thereof use the means of controlling settings of the internal circuits of the receiving module (sensing circuit) to have the receiving module only perform searching for the specific parameters while the receiving module scans for the signal of the channel. Thus, the optimum wireless signal of each channel can be found and the parameters of the optimum wireless signal are stored. When a user wants to view a different channel, the receiving module is instructed to automatically use the corresponding stored parameters of the channel to receive the optimum wireless signal so that the signal receiving and viewing quality can be increased. Since the receiving module only performs searching for the specific parameters, it can save a lot of time while performing signal detection, compared to the prior art that needs to do detection for all the parameters. Thus, the detection speed and setting speed of the receiving module can be increased to solve all the possible problems in the prior art.

DETAILED DESCRIPTION OF THE INVENTION

Figure 1A:
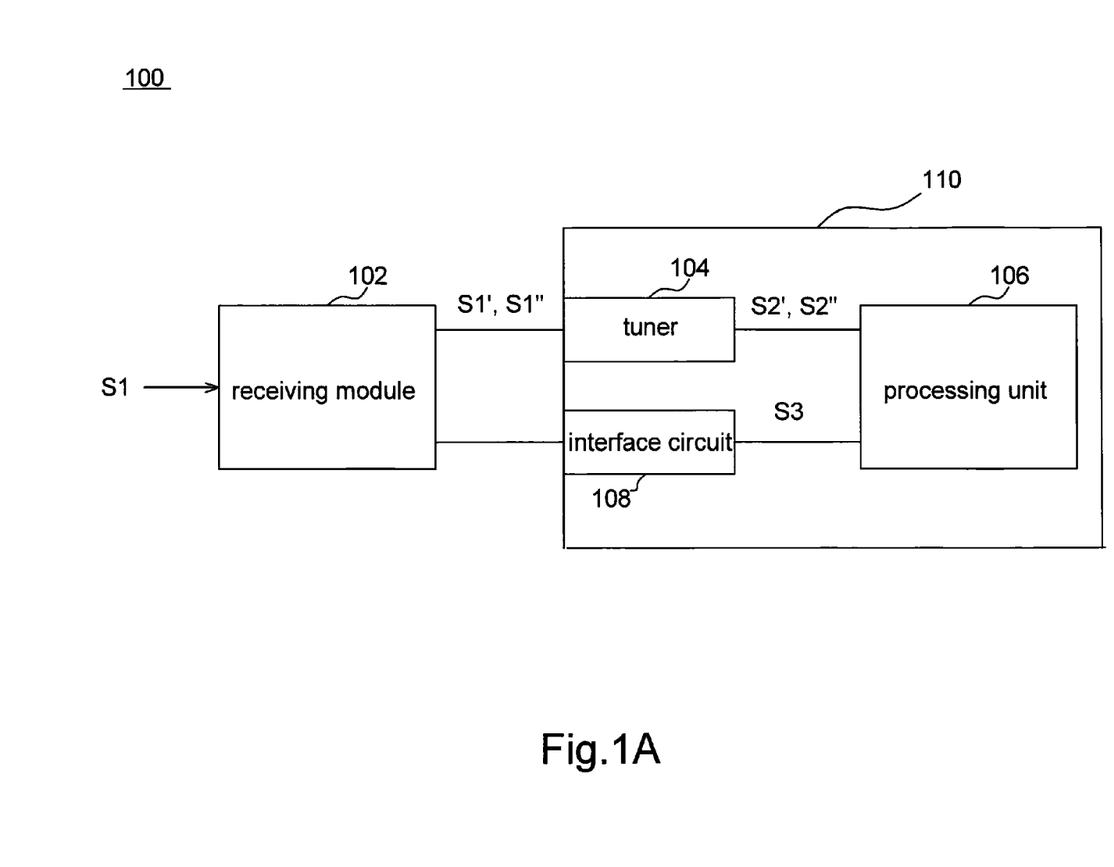
FIG. 1A shows a schematic diagram illustrating a receiving device according to one embodiment of the invention.

Please refer to FIG. 1A. FIG. 1A shows a schematic diagram illustrating a receiving device 100 according to one embodiment of the invention. The receiving device (or wireless signal receiving system or antenna processing system) 100 comprises a receiving module 102 and a processing module 110. The processing module 110 comprises a tuner 104, a processing unit 106, and an interface circuit 108.

The receiving module 102 comprises a plurality of parameters and is to set the parameters according to a control signal S3 and to receive a wireless signal S1 (for example, a radio-frequency signal) according to settings of the different parameters so as to output a first output signal S1' and a second output signal S1". In one embodiment, the receiving module 102 is an antenna or a sensing circuit. The parameters include at least one parameter or at least two parameters among a direction parameter, a gain parameter, and a polarity parameter.

The processing module 110 couples to the receiving module and generates the control signal S3 according to the first and second output signals S1', S1" to set the parameters of the receiving module 102. In one embodiment, the tuner 104 performs frequency conversion on the output signals S1', S1" to generate conversion signals S2', S2". For example, the output signals S1', S1" are converted into base-band signals to generate the conversion signals S2', S2". Then, the processing unit 106 receives and processes the conversion signals S2', S2" to obtain at least one reference value, separately. Thus, the processing unit 106 generates the control signal S3 according to the reference values and controls (or sets, adjusts) the receiving module 102 through the interface circuit 108. The processing unit 106 selects one optimum signal having the optimum signal quality from the first and second output signals S1', S1" according to settings of the parameters and the reference values as an output signal to be processed and used by the subsequent circuit. In one embodiment, the reference value can be at least one value selected from the group consisting of the following or combination thereof: signal-to-noise ratio, packet error rate and bit error rate. In another embodiment, the reference value can be any current determining value or any determining value to be developed in the future.

It should be noted that in one embodiment the receiving module 102 is to receive the control signal S3 and set at least one parameter of the receiving module 102 according to the control signal S3. For example, in a unidirectional communication control method, the receiving module 102 sets the direction parameter according to the control signal S3 and decides one direction for receiving; or the receiving module 102 sets the gain parameter according to the control signal S3 to adjust the gain of the receiving module 102. In another embodiment, the receiving module 102 receives the control signal S3 and sets at least one parameter of the receiving module 102; and the receiving module 102 generates at least one feedback signal according to the state of the system or the state of signal receiving and feedbacks to the processing unit 106 through the interface circuit 108. Thus, the processing module 110 decides to perform either the unidirectional communication control or the bidirectional communication control between the processing module 110 and the receiving module 102 through the interface circuit 108, according to user settings or system default so that the user needs can be satisfied to achieve a special effect. For example, the unidirectional communication control can save power, which is a power saving mode.

Figure 1B:
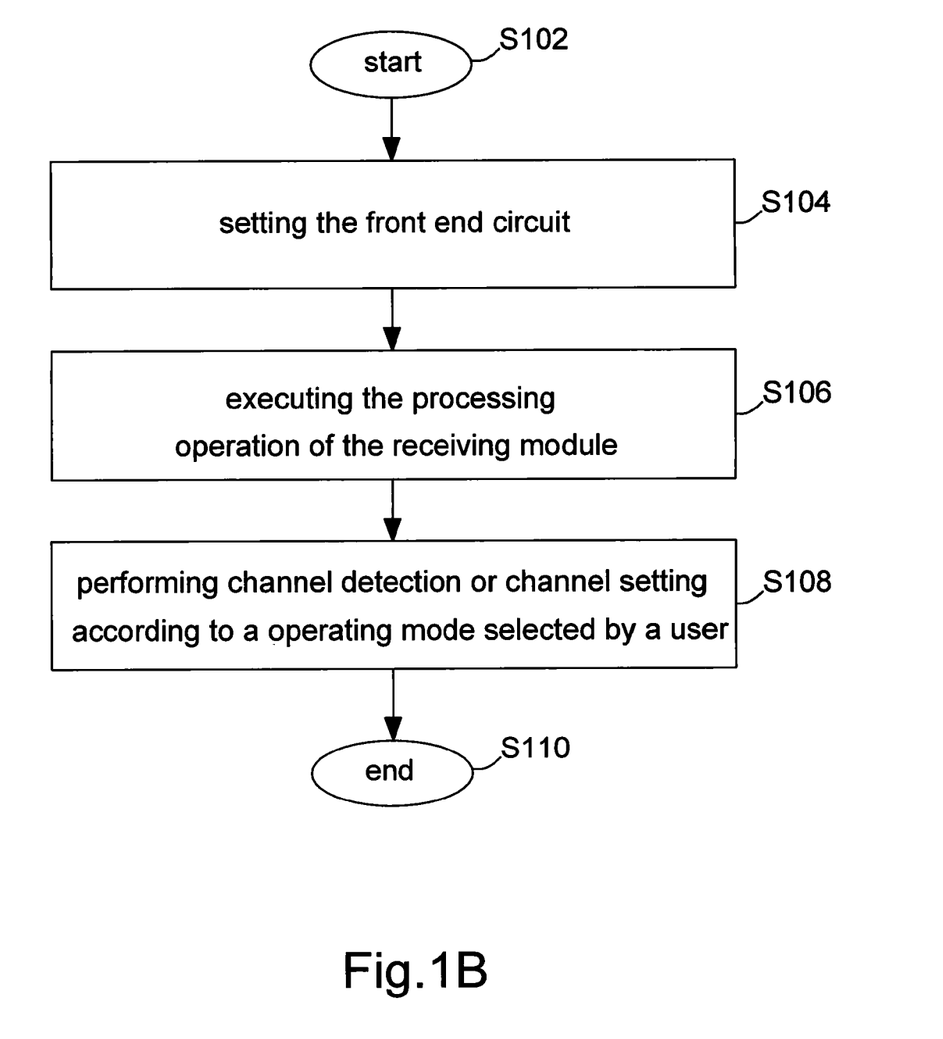
FIG. 1B shows a flow chart illustrating a channel receiving method of how the processing module of the receiving device controls the receiving module to detect or set the wireless signal in the receiving device according to one embodiment of the invention.

FIG. 1B shows a flow chart illustrating a channel receiving method of how the processing module 110 of the receiving device 100 controls the receiving module 102 to detect or set the wireless signal S1 in the receiving device according to one embodiment of the invention. The method comprises the following steps:

Step S102: start;

Step S104: setting the front end circuit (in one embodiment, it is to set a tuner);

Step S106: executing the processing operation of the receiving module (In one embodiment, the mode selection of the receiving module is executed.);

Step S108: performing channel detection or channel setting according to a operating mode selected by a user; and Step S110: end.

The method that the processing module 110 controls the receiving module 102 to detect or set the wireless signal S1 comprises at least three modes: manual mode, full mode, and quick mode. The processing module 110 decides to select one mode according to user setting or system default. It should be noted that the processing module 110 is to set at least one parameter of the receiving module 102 under any of the three modes to control the channel detection and setting of the receiving module 102 so that the receiving module 102 can receive the optimum wireless signal S1 of any channel. In one embodiment, the parameters of the receiving module 102 comprise a receiving direction, gain, polarity, and etc. Certainly, the parameters used by the receiving module 102 of the receiving device 100 according to the embodiment of the invention are not limited to the above example but various current parameters or any parameter to be developed in the future which is needed for an antenna can be used.

In the above, the manual mode according to one embodiment of the invention is that a user utilizes the processing module 110 to set the specific values according to settings of the parameters of the receiving module 102 for detecting a wireless signal or doing detection on a specific channel. The processing steps of the manual mode are as follows: at first providing a manual mode to set the operating mode of the parameter setting of the receiving module 102; then setting the operating mode of the parameter setting of the receiving module 102; and finally performing channel detection and setting by the receiving module 102 according the set mode.

The full mode according to one embodiment of the invention is that the processing module 110 performs channel setting and scanning on the combinations of all possible values of all the parameters of the receiving module 102 to obtain the optimum signal of each channel.

The quick mode according to one embodiment of the invention is that the processing module 110 sets some parameters in the parameters of the receiving module 102 to fixed values and sets the specific parameters to variable parameters. The processing module 110 detects or sets these specific parameters by filling in a value within a predetermined range one by one to obtain the optimum signal of each channel. The processing steps of the quick mode are as follows: at first providing a quick mode to set the operating mode of the parameter setting of the receiving module 102; then setting the operating mode of the parameter setting of the receiving module 102; and finally performing channel detection and setting by the receiving module 102 according the set mode.

It should be noted that under the quick mode of one embodiment of the invention the processing module 110 of the receiving device 100 can quickly achieve the function of controlling the receiving module 102 to detect or set the channel in the wireless signal S1 and having the receiving module 102 receive the optimum wireless signal so that an excellent receiving effect can be achieved.

Figure 2:
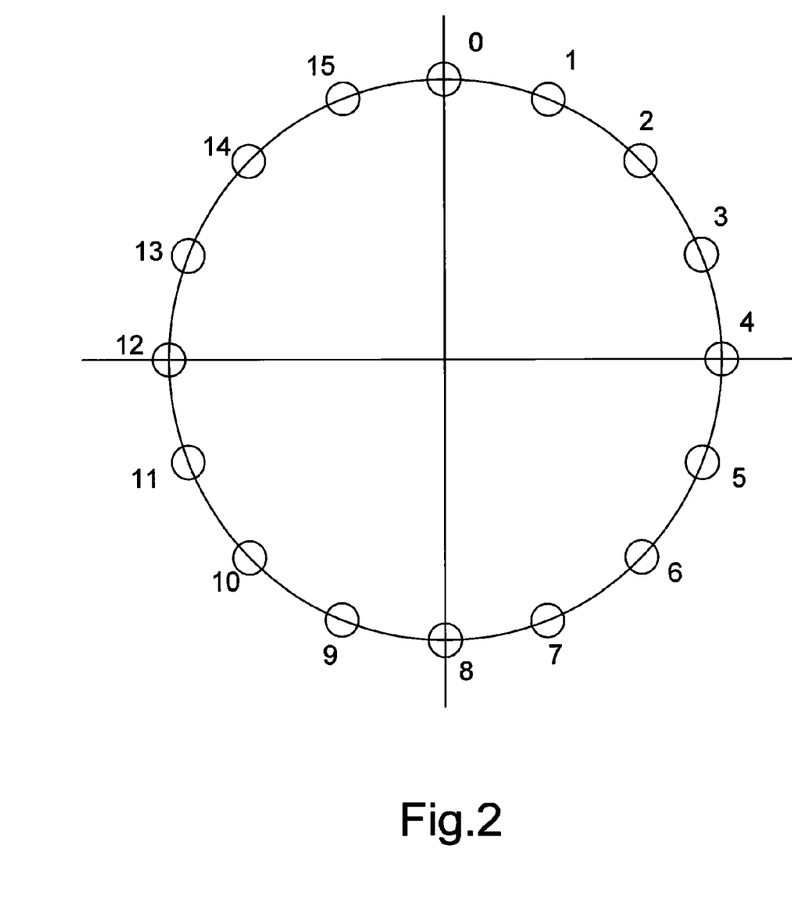
FIG. 2 shows a schematic diagram illustrating the detection direction of the receiving module according to one embodiment of the invention.

Referring to FIG. 1A and FIG. 2, the operating method of the receiving device 100 under the quick mode is described in details in the following. FIG. 2 shows a schematic diagram illustrating the detection direction of the receiving module 102.

In this embodiment, it is assumed that the detection direction of the receiving module 102 can be divided into 16 directions, such as the directions 0~15 shown in FIG. 2. In this embodiment, the direction 0 is the north, the direction 4 is the east, the direction 8 is the south, and the direction 12 is the west. It should be noted that the detection direction and the number of the detection directions of the invention are not limited to the above example. The detection direction and the number of the detection directions can be determined according to user needs or the characteristic of the receiving module 102.

In this embodiment, it is assumed that the receiving module 102 comprises three setting parameters, that is, direction, gain, and polarity parameters. During the system is in operation, at least one parameter is selected as the variable parameter to be controlled primarily and the rest of the parameters are preset to fixed values in advance.

For example, it is assumed that the values of the direction parameter of the receiving module 102 include 0~15, the values of the gain parameter include 0~3, and the values of the polarity parameter include 0~1. In order to quickly set the three parameters, according to one embodiment of the invention, the processing unit 106 selects the direction parameter as the major variable parameter to control and the values of the direction parameter can be 0~15. Thus, during the initialization state, the processing unit 106 outputs a control signal S3 through the interface circuit 108 to set the gain and polarity parameters of the receiving module 102 to fixed values. For example, the gain parameter is set to 3 and the polarity parameter is set to 0.

Since the gain and polarity parameters are fixed values, the processing unit 106 does not need to do setting. Then, the setting operation for the direction parameter is to be executed. The processing unit 106 outputs the control signal S3 through the interface circuit 108 to notify the receiving module 102 to select one channel, and to control the receiving module 102 to do coarse detection on the channel. For example, the processing unit 106 separately fills the direction parameter with the values 0, 4, 8, and 12 to have the receiving module 102 detects the wireless signals S1 in the directions 0, 4, 8, and 12. The tuner 104 receives the four wireless signals S1 and separately generates four conversion signals S2. The processing unit 106 calculates one reference value for each direction in the four directions. Then, after the reference values are compared to each other according to their magnitude, one target reference value is obtained; or after the reference values are separately compared to a predetermined value, one target reference value closest to the predetermined value is obtained. According to this target reference value, the major directions having the optimum wireless signals S1 with the optimum signal quality can be determined and then at least one of the major directions is used to determined the direction for the receiving module 102 to do fine detection so as to obtain the optimum wireless signal S1 of the channel in each direction. The above reference values can be at least one value selected from the group consisting of the following or combination thereof: signal-to-noise ratio (SNR), packet error rate and bit error rate.

In one embodiment, the processing unit 106 controls the receiving module 102 to do coarse detection to detect the wireless signal S1 of each direction for the directions 0, 4, 8, and 12. The SNR value of the direction 0, the SNR value of the direction 4, the SNR value of the direction 8, and the SNR value of the direction 12 are obtained. Then, the processing unit 106 determines the direction having the maximum SNR value by comparing the four SNR values. It is assumed here that the signal in the direction 0 has the maximum SNR value. The processing unit 106 controls the receiving module 102 to do fine detection to detect the directions according to the order: the direction 1→the direction 15→the direction 2→the direction 14→the direction 3→the direction 13. The SNR value of each direction is obtained. Finally, the processing unit 106 determines the direction having the maximum SNR value by comparing the SNR values of the directions 1, 15, 2, 14, 3, and 13. For example, the direction of the wireless signal S1 having the maximum SNR value is 15 and thus the direction parameter of this channel for the receiving module 102 is fixed as 15. Certainly, other order can be used. For example, the order can be the direction 13→the direction 14→the direction 15→the direction 1→the direction 2→the direction 3.

After the above setting, the receiving device 100 stores the optimum direction of the channel as 15. As a user views the program of this channel each time, the receiving module 102 receives the wireless signal S1 of this channel in the direction 15 according to the stored setting so that the optimum receiving quality of this channel can be achieved. Thus, one optimum direction for receiving the wireless signal S1 of each channel can be obtained after the settings through coarse and fine detection. For example, the optimum direction for receiving the wireless signal S1 of the first channel is 15, the optimum direction for receiving the wireless signal S1 of the second channel is 8, and so forth. The receiving device 100 separately stores the optimum direction for receiving the wireless signal S1 of each channel. Thus, for each channel to be viewed, the signal can be received according to the stored direction parameter of each channel so that the effect of receiving the optimum signal for each channel can be achieved and the signal receiving quality is also improved.

On the other hand, as the signal quality of the wireless signal S1 of any channel in the original set direction becomes worse to have the program unclear to be viewed or the wireless signal S1 of any channel in the original set direction disappears to have the program unable to be viewed, the receiving device 100 of the invention will do the above coarse and fine detection again to find out the optimum receiving direction and stores the direction parameter again.

It should be noted that the order for detecting the detections for the receiving device 100 of the invention is not limited to the above example. Other methods can be used. For example, the bisection method can be used to do detection and convergence on a pair of directions; or any other current or future algorithm can be used to do detection. In one embodiment, the processing unit 106 controls the receiving module 102 to do coarse detection to detect the wireless signal S1 of each direction for the directions 0, 4, 8, and 12. The SNR value of the wireless signal S1 of the direction 0, the SNR value of the wireless signal S1 of the direction 4, the SNR value of the wireless signal S1 of the direction 8, and the SNR value of the wireless signal S1 of the direction 12 are obtained. Then, the processing unit 106 determines the direction of the wireless signal S1 having the largest SNR value by comparing the four SNR values. It is assumed here that the signal in the direction 0 has the largest SNR value and the signal in the direction 4 has the second largest SNR value. The processing unit 106 performs fine detection according to the largest SNR value and the second largest SNR value. That is, the processing unit 106 controls the receiving module 102 to detect the directions 1, 2, and 3 and obtains each SNR value for the directions 1, 2, and 3. Then, the processing unit 106 determines the direction of the wireless signal S1 having the largest SNR value by comparing each SNR value for the directions 1, 2, and 3 and sets the direction parameter of the receiving device 100. Thus, the direction parameter having the optimum signal quality is obtained.

Figure 3A:
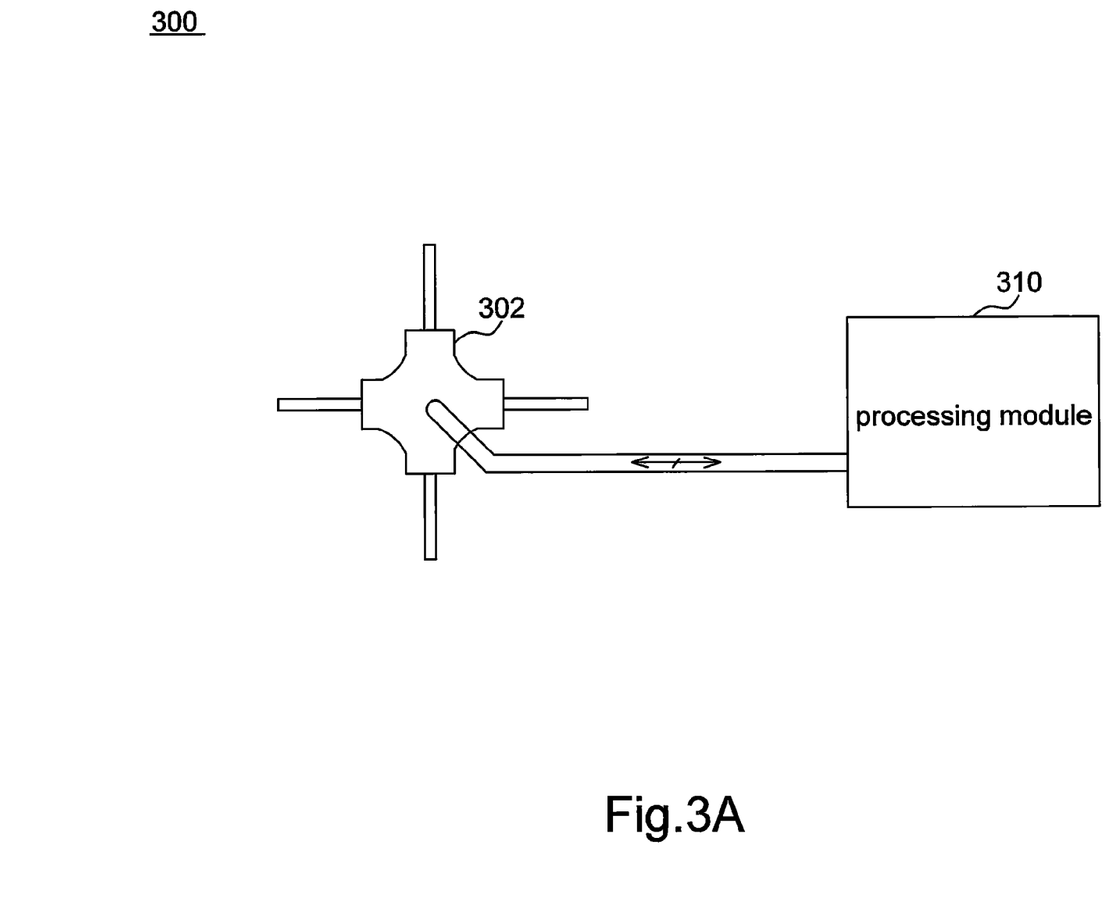
FIGS. 3A-3B show a flow chart illustrating a method for controlling the receiving module in the receiving device according to one embodiment of the invention.

FIG. 3A shows a schematic diagram illustrating an antenna processing system according to one embodiment of the invention. The antenna processing system 300 comprises an antenna 302 and a processing module 310. The antenna 302 is to receive one wireless signal comprising a channel. The processing module 310 sets the direction parameter of the antenna 302 to control the antenna 302 to detect wireless signals of a plurality of directions according to the direction parameter to obtain a plurality of reference values separately. The processing module 310 selects one reference value closest to a predetermined value from the reference values as a target reference value. According to the target reference value, the processing module 310 generates a control signal to control the antenna to select the corresponding direction of the target reference value as the signal receiving direction while the antenna is to receive the wireless signal of the channel. The above reference values can be at least one value selected from the group consisting of the following or combination thereof: signal-to-noise ratio, packet error rate and bit error rate.

Figure 3B:
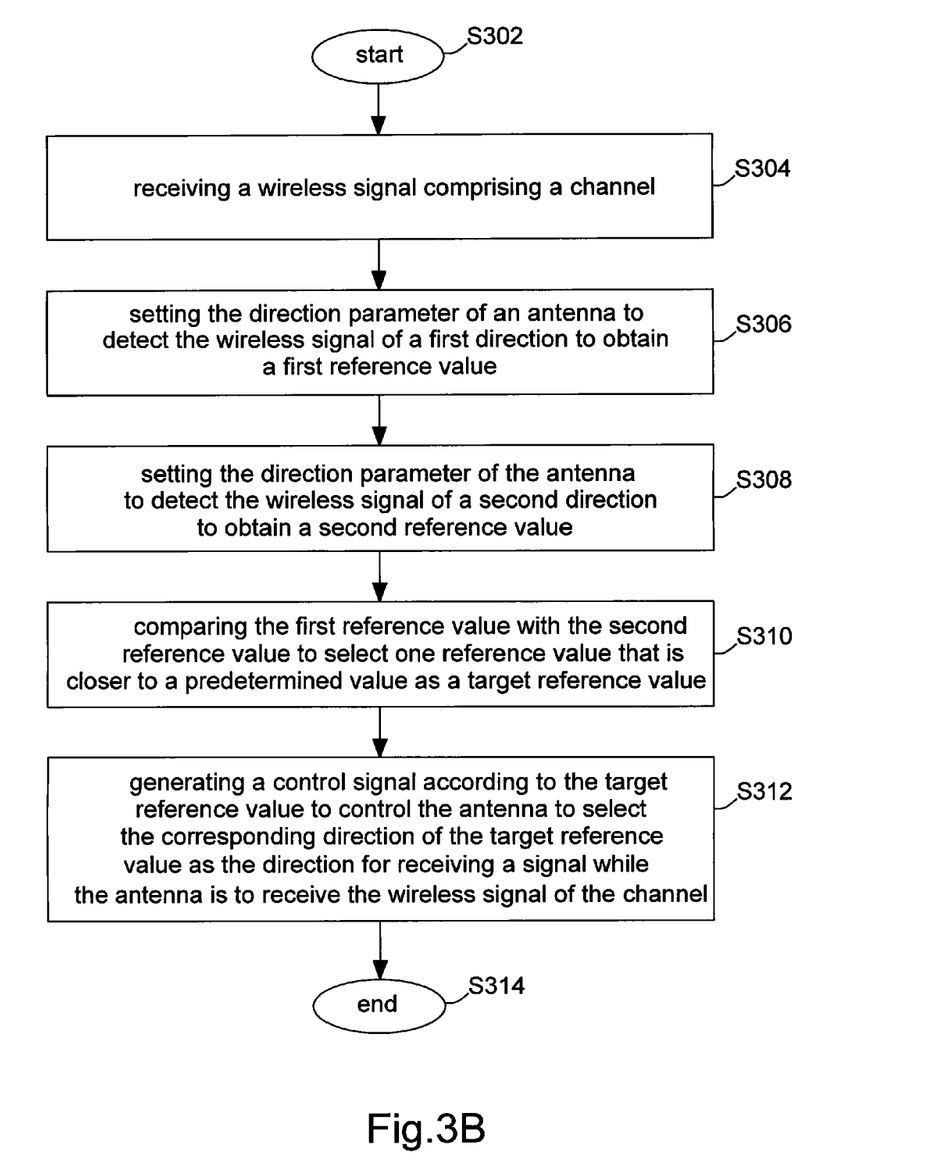

FIG. 3B shows an antenna control method according to one embodiment of the invention, comprising the following steps:

Step S302: start;

Step S304: receiving a wireless signal comprising a channel;

Step S306: setting the direction parameter of an antenna to detect the wireless signal of a first direction to obtain a first reference value;

Step S308: setting the direction parameter of the antenna to detect the wireless signal of a second direction to obtain a second reference value;

Step S310: comparing the first reference value with the second reference value to select one reference value that is closer to a predetermined value as a target reference value;

Step S312: generating a control signal according to the target reference value to control the antenna to select the corresponding direction of the target reference value as the direction for receiving a signal while the antenna is to receive the wireless signal of the channel; and Step S314: end.

According to the embodiment of the invention, the above reference values can be at least one value selected from the group consisting of the following or combination thereof: signal-to-noise ratio, packet error rate and bit error rate.

Figure 4:
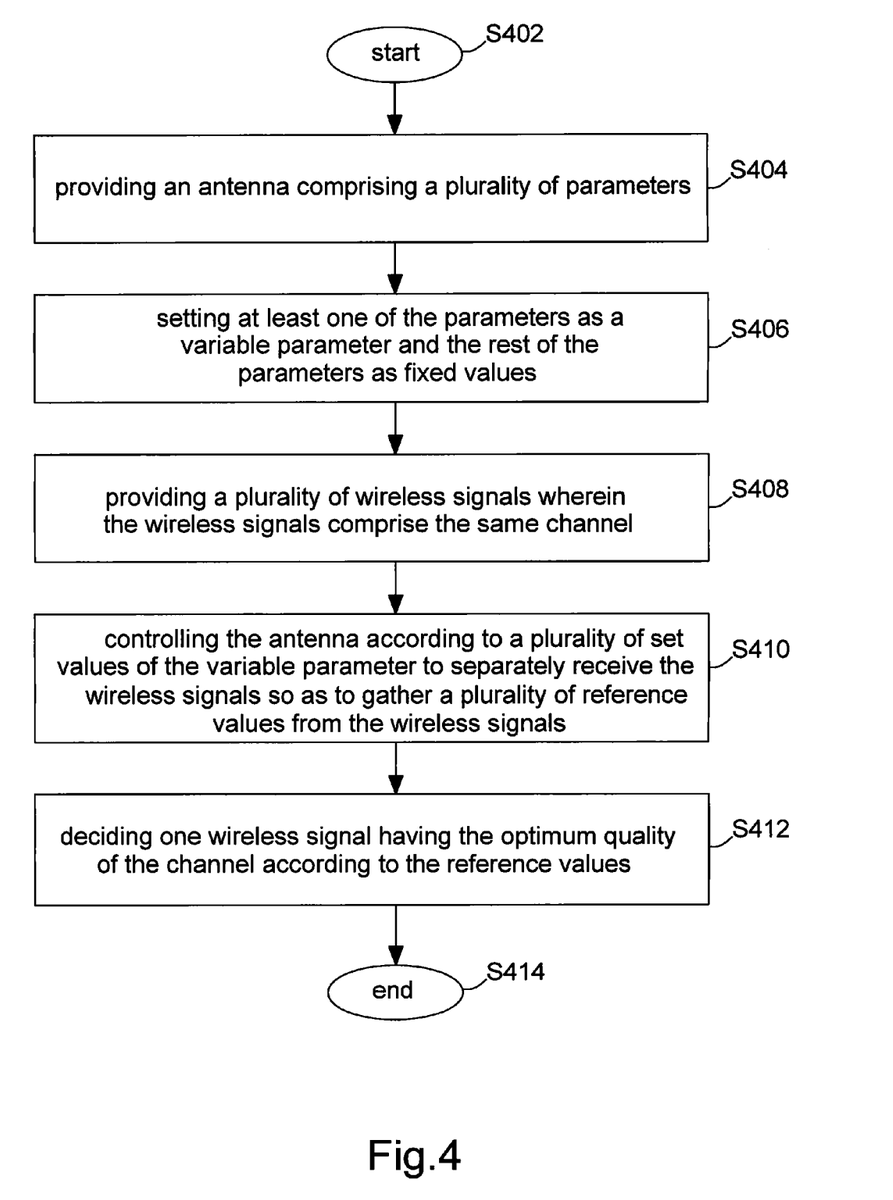
FIG. 4 shows a flow chart illustrating a method for controlling the receiving module in the receiving device according to another embodiment of the invention.
Figure 5:
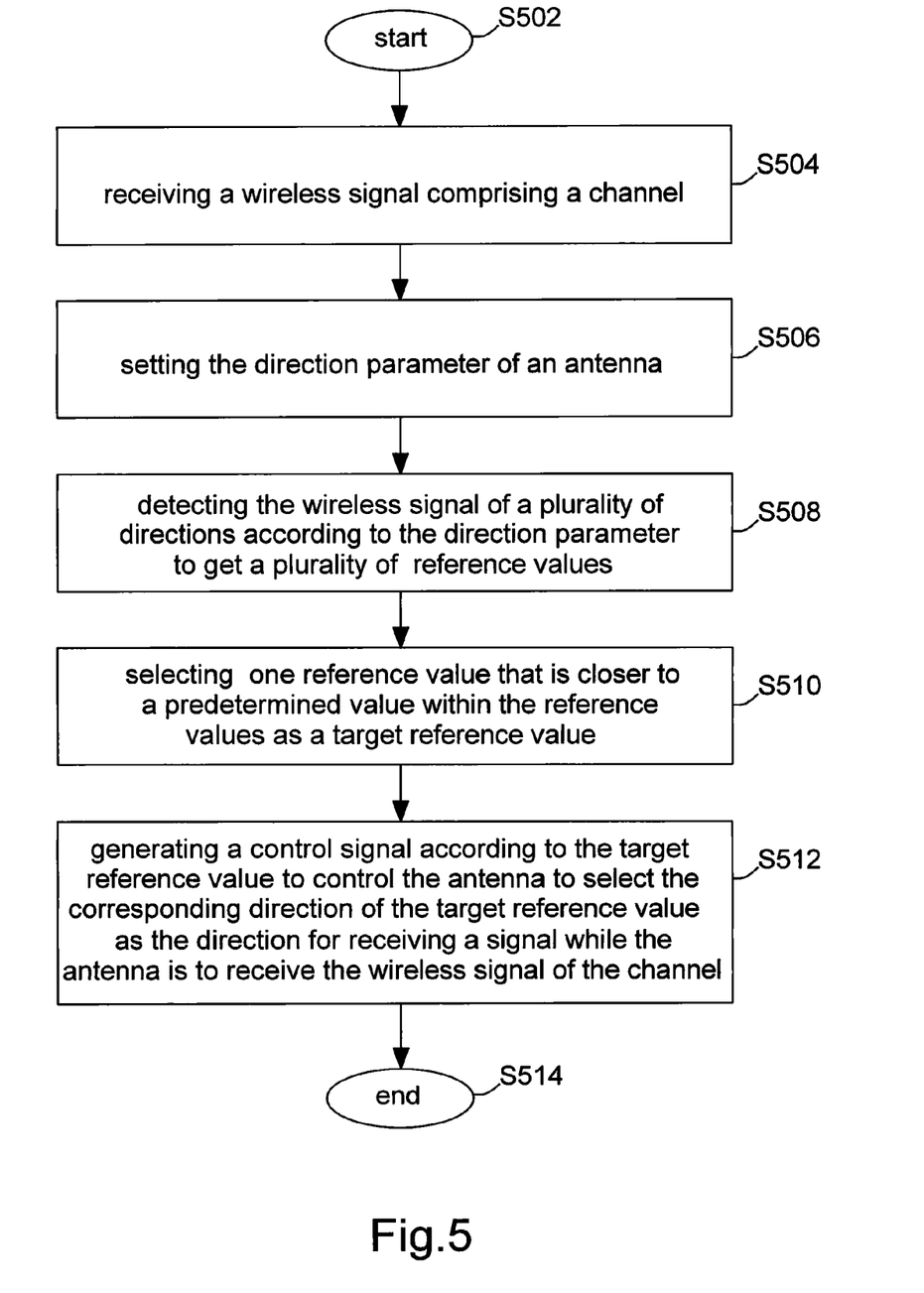
FIG. 5 shows a flow chart illustrating a method for controlling the receiving module in the receiving device according to another embodiment of the invention.

FIG. 4 and FIG. 5 show flow charts of the setting method of the receiving module according to the embodiment of the invention. Those who are skilled in the art should understand that the content of the two embodiments shown in the figures is disclosed in the above receiving device. Thus, details will not be given hereinafter.

In conclusion, the receiving device of the invention uses the processing unit to control settings of the internal circuits of the receiving module to have the receiving module only perform searching for the specific parameters while the receiving module scans for the signal of the channel. Thus, the corresponding parameters (such as direction parameter or gain parameter, and etc. for receiving) of the optimum wireless signal of each channel can be found and the parameters of the optimum wireless signal are stored. When a user wants to view a different channel, the receiving module is instructed to automatically use the corresponding stored parameters of the channel to receive the optimum wireless signal so that the signal receiving and viewing quality can be increased. Since the receiving module only performs searching for the specific parameters, it can save a lot of time while performing signal detection, compared to the prior art that needs to do detection for all the parameters. Thus, the detection speed and setting speed of the receiving module can be increased to solve all the possible problems in the prior art.

Although the present invention has been fully described by the above embodiments, the embodiments should not constitute the limitation of the scope of the invention. Various modifications or changes can be made by those who are skilled in the art without deviating from the spirit of the invention.

What is claimed is:

1. A receiving device, comprising:
a receiving module, including a plurality of parameters, for setting the parameters according to a control signal, receiving a wireless signal according to settings of the different parameters, and outputting a first output signal and a second output signal separately; and
a processing module, coupling to the receiving module, for generating the control signal to set the parameters according the first output signal and the second output signal, wherein the processing module is further configured to perform one of unidirectional communication control or bidirectional communication control between the processing module and the receiving module through an interface circuit according to a power saving mode.

2. The device according to claim 1, wherein the parameters comprise at least one parameter or at least two parameters selected from the group consisting of the following: direction parameter, gain parameter, and polarity parameter.

3. The device according to claim 1, wherein the receiving module decides a receiving direction according to the direction parameter.

4. The device according to claim 1, wherein the receiving module adjusts the gain of the receiving module according to the gain parameter.

5. The device according to claim 1, wherein the power saving mode is specified by one of user settings or a system default setting of the device.

6. The device according to claim 5, wherein the receiving module generates at least one feedback signal according to the system state of the device or the state of receiving a signal and performs bidirectional data transmission and control with the processing module through the interface circuit.

7. The device according to claim 1, wherein the processing module generates the control signal according to at least one reference value among a signal-to-noise ratio (SNR), a packet error rate and a bit error rate of the first output signal and the second output signal.

8. The device according to claim 7, wherein the processing module selects an optimum signal having the optimum signal quality as an output signal from first and second input signals according to the parameters and the reference values.

9. A signal receiving method, comprising:
providing a sensing circuit that operates according to a plurality of parameters wherein the parameters comprise a plurality of variable parameters;
receiving a first input signal and a second input signal through the sensing circuit wherein the first input signal and the second input signal both comprise a plurality of reference values;
selecting the first input signal and the second input signal by the sensing circuit according to the parameters and the reference values to generate an output signal; and
providing a processing circuit for comparing the first input signal and the second input signal according to the reference values to generate a control signal for controlling at least one of the variable parameters.

10. The method according to claim 9, wherein the step of generating the output signal further comprises:
selecting an optimum signal having the optimum signal quality as an output signal from the first and the second input signals according to the parameters and the reference values by the sensing circuit.

11. The method according to claim 9, wherein the step of generating the output signal further comprises:
adjusting the optimum signal according to the parameters by the sensing circuit.

12. The method according to claim 9, wherein the parameters comprise at least one parameter selected from the group consisting of the following: direction parameter, gain parameter, and polarity parameter.

13. The method according to claim 9, wherein the reference values comprise at least one value selected from the group consisting of the following: signal-to-noise ratio, packet error rate and bit error rate.

14. The method according to claim 9, wherein the sensing circuit is an antenna and the first and the second input signals are wireless signals.

15. The method according to claim 9, wherein the step of generating the output signal further comprises:
   providing a manual mode to set an operating mode of the parameter setting of the sensing circuit;
   setting the operating mode of the parameter setting of the sensing circuit; and
   performing channel detection and setting by the sensing circuit according the set mode.

16. The method according to claim 9, wherein the step of generating the output signal further comprises:
   providing a quick mode to set an operating mode of the parameter setting of the sensing circuit;
   setting the operating mode of the parameter setting of the sensing circuit; and
   performing channel detection and setting by the sensing circuit according the set mode.

* * * * *